United States Patent [19]

Meyer et al.

[11] Patent Number: 5,088,805
[45] Date of Patent: Feb. 18, 1992

[54] ELECTRODYNAMIC ACTUATOR FOR AN OPTICAL WRITE-IN OR READ-OUT UNIT

[75] Inventors: Karl-Hanns Meyer; Leo Honds, both of Aachen, Fed. Rep. of Germany

[73] Assignee: U.S. Philips Corporation, New York, N.Y.

[21] Appl. No.: 649,136

[22] Filed: Jan. 29, 1991

Related U.S. Application Data

[63] Continuation of Ser. No. 395,129, Aug. 17, 1989, abandoned.

[30] Foreign Application Priority Data

Aug. 19, 1988 [DE] Fed. Rep. of Germany ....... 3828146

[51] Int. Cl.[5] .............. G11B 7/08; G02B 7/02
[52] U.S. Cl. .................. 359/814; 369/44.15; 359/824
[58] Field of Search .............. 350/247, 255; 369/44, 369/45, 44.14, 44.15; 267/178, 179

[56] References Cited

U.S. PATENT DOCUMENTS

| | | | |
|---|---|---|---|
| 4,332,305 | 6/1982 | Kocolowski | 49/31 X |
| 4,386,823 | 6/1983 | Musha | 350/247 |
| 4,646,283 | 2/1987 | Ito et al. | 350/255 X |
| 4,669,823 | 6/1987 | Iguma et al. | 350/255 |
| 4,813,033 | 3/1989 | Baasch et al. | 369/45 |

FOREIGN PATENT DOCUMENTS

| | | | |
|---|---|---|---|
| 0144445 | 6/1985 | European Pat. Off. | |
| 0178077 | 4/1986 | European Pat. Off. | 369/44.14 |
| 1613987 | 7/1971 | Fed. Rep. of Germany | |
| 2810616 | 9/1978 | Fed. Rep. of Germany | |
| 3234288 | 3/1984 | Fed. Rep. of Germany | |
| 195340 | 6/1984 | Japan | 369/44.15 |
| 221837 | 12/1984 | Japan | 369/45 |
| 24036 | 2/1986 | Japan | 369/44.15 |
| 04821 | 6/1988 | PCT Int'l Appl. | 369/44.15 |

*Primary Examiner*—Bruce Y. Arnold
*Assistant Examiner*—David R. Parsons
*Attorney, Agent, or Firm*—David R. Treacy

[57] ABSTRACT

In an electrodynamic actuator for an optical write-in or read-out unit (11), which is aligned with respect to signal tracks of a storage medium in order to direct a focused light beam (13) onto a work position, the actuator includes an optical unit (11) is arranged on a movable permanent magnet arrangement (5, 5a) which can be moved by means of stationary coils (17a, 17b, 19a, 19b) located in its vicinity in focusing (z) and radial (x) directions running perpendicular to one another, the coils being located in the radial direction (x) on both sides of the permanent magnet arrangement (5, 5a), and the magnetization of the permanent magnet arrangement being chosen in such a way that its magnetic field in the region of coils (17c, 17d, 19c, 19d) opposite to it has both an x component and z component, the permanent magnet arrangement (5, 5a) with the optical unit (11) in the magnetic field of the coils is arranged at the free ends of spring rods (3) clamped at one end, and the spring rods (3) of the permanent magnet arrangement (5, 5a) provide flexible support and allow movement perpendicular to the focusing direciton or radial direction.

21 Claims, 1 Drawing Sheet

ELECTRODYNAMIC ACTUATOR FOR AN OPTICAL WRITE-IN OR READ-OUT UNIT

This is a continuation of application Ser. No. 395,129, filed Aug. 17, 1989, now abandoned.

BACKGROUND OF THE INVENTION

The invention relates to an electrodynamic actuator for an optical write-in or read-out unit which is aligned with respect to signal tracks of a storage medium in order to direct a focused light beam onto a work position.

Electrodynamic actuators of this type are known from audio, video and data systems technology. A focused light beam is guided by an optical system onto a storage medium, which can be, for example, a rotating plate (German patent documents Offenlegungsschrift 2,810,616). It is true that in this German Offenlegungsschrift only read-out takes place with the aid of the beam bundle; however write-in is equally possible, as is known from German Offenlegungsschrift 1,613,987. Both with write-in and also with read-out, it is necessary first to bring the laser beam into the write-in or read-out work position by means of an electromechanical control device, and then in this position to focus the objective by means of an actuator onto the precise position to be written in or read out.

From German Patent 3,234,288 an electrodynamic actuator is known in which the optical system is mounted floating in a magnet system. Furthermore, an actuator with movable coils is known from European patent documents EP-A-144,445. The coils have flexible supply leads. The flexible supply leads are expensive, and are likely to interfere with the movements of the actuator.

SUMMARY OF THE INVENTION

It is an object of the invention to provide an electrodynamic actuator which is constructed from a few, simple parts, and which has no moving lead-in wires to its coils.

According to the invention:

The present invention achieves its object by having;

an optical unit is arranged on a movable permanent magnet arrangement which can be moved by means of stationary coils located in its vicinity in focusing and radial directions running perpendicular to one another, the coils are located in the radial direction on both sides of the permanent magnet arrangement, and the magnetization of the permanent magnet arrangement is selected so that its magnetic field in the region near parts of the coil provides both an x component and a z component of force, the permanent magnet arrangement with the optical unit in the magnetic field of the coils is arranged at the free ends of spring rods clamped at one end, the spring rods of the permanent magnet arrangement extend generally in response to the components of force perpendicular to the focusing to the focusing direction to position the permanent magnet arrangement between the coils and permit movement in the focusing and radial directions, or radial direction.

Such an electrodynamic actuator is a simple structure wherein the permanent magnets are suspended on the spring rods. The spring rods themselves are held at their clamping locations in a displaceable bearing, by which focusing corrections can be carried out in the focusing direction, and radial corrections in the radial direction.

According to a further illustrative embodiment of the invention, it is provided that the stationary coils are located in the radial direction on both sides of the movable permanent arrangement and are arranged in pairs in parallel planes running in the radial direction in such a way that planes running in the radial direction in such a way that in each case a conductor or a bundle of conductors in each coil runs adjacent to the permanent magnet arrangement in the y direction, i.e. perpendicular to the focusing and the radial direction. Each individual coil or its conductor exerts on the permanent magnet arrangement a force and a torque, both in general having several components. An intended movement of the permanent magnet arrangement in two directions perpendicular to one another (the focusing direction z and the radial direction x) presupposes two independent forces in these directions. Force components in other directions and torques are undesirable, since the mechanical suspension provided by the spring rods has too many degrees of freedom (possible directions of movement, including limited pivoting). Appropriate current distributions are to be set up in the conductor rods to generate the focusing and radial force in their respective directions. Given coil currents independent of one another, the resultant force vector can then contain only either a z component or an x component, the resultant torques vanishing. Likewise, arbitrary superimpositions of the two forces can be produced wherein the magnet is moved simultaneously in both directions.

The two principal components, the permanent magnet arrangement and the coil arrangement, are uncomplicated and can be fabricated economically.

According to a further illustrative embodiment of the invention, the portions of the coils extending as conductors generally in the y direction and the permanent magnet arrangement have approximately the same lengths in the y direction. Moreover, it is advantageous if it is provided according to a further embodiment of the invention that these portions of the coils have a mutual clearance on both sides of the permanent magnet arrangement which extends along the extent of the permanent magnet arrangement in the y direction, and that in its middle position the permanent magnet arrangement is located approximately within the parallel planes of the coils at a clearance between the conductor rods. With such a coordination of conductor dimensions and permanent magnet arrangement, optimal field effects can be achieved between coils and permanent magnet arrangement.

According to a further embodiment of the invention, the permanent magnet arrangement includes a permanent magnet which supports in its center the optical unit, which is oriented in the z direction. It is likewise possible and advantageous to arrange the optical unit alongside the permanent magnet or on a central support which supports the optical unit, which is oriented in the z direction, and which is supported laterally with respect to the conductors and the permanent magnets.

According to a further illustrative embodiment of the invention, it is provided that the permanent magnet arrangement has a preferred magnetic direction (anisotropic) in the z direction, and is magnetized in this direction. The embodiment can equally be provided in an advantageous fashion in such a way that the permanent magnet arrangement has a preferred magnetic direction (anisotropic) in the x direction, and is magnetized in this direction. The magnetic field in the coil region is thereby intensified.

According to a further embodiment of the invention, it can be provided that the magnetic material is isotropic, and this material is magnetized in the z or x direction. Such magnetic materials are more economical and permit economic fabrication of the permanent magnet.

According to a further embodiment of the invention, it is provided that the magnetization has both a z component and also an x component. The magnetization of the magnet is thereby inhomogeneous, and permits more freedom of action in apportioning the magnetic fields in the coil region to the x and z components.

According to a further embodiment of the invention, it is provided that each of the pairs of coils has the form of area strips or conducting runs on the two surfaces of a printed-circuit board. In this way, the coils can be produced economically, and connected to the support of the permanent magnet.

BRIEF DESCRIPTION OF THE DRAWINGS

The invention is explained in more detail with reference to the drawing, in which.

DETAILED DESCRIPTION OF THE PREFERRED EMBODIMENT

Figure 1:
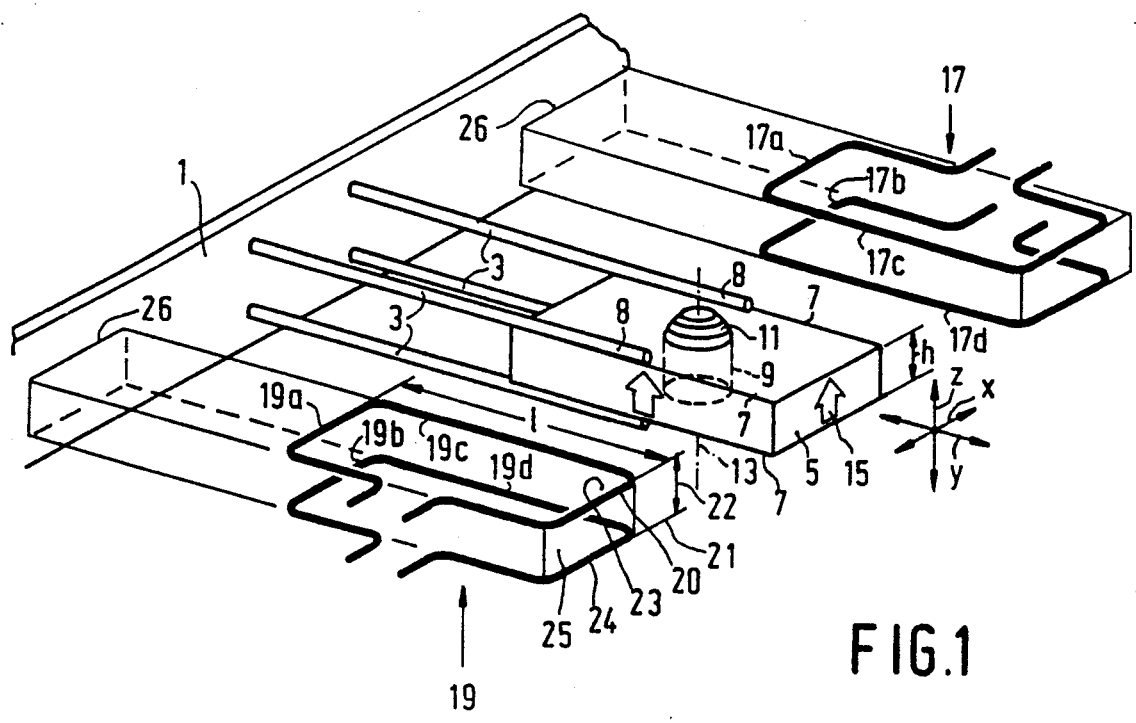
FIG. 1 shows an electrodynamic actuator for an optical write-in or read-out unit with a movably arranged magnet.

In FIG. 1, a magnet arrangement 5 in the form of a permanent magnet is suspended with the aid of four spring rods 3 on a support 1 which, for example, can be moved away over a storage plate via a slewing arm or tangential arm. The permanent magnet 5 is magnetized uniformly in the direction of an arrow 15 in the focusing or z direction of the system. The spring rods 3 are clamped in the support 1, and hold the parallelepiped-shaped permanent magnet at its longitudinal edges 7 with their free ends 8. In the center of the permanent magnet 5 there is located a bore 9, in which there is installed a photo-optical unit 11, which is transilluminated in the focusing direction by a light beam, for example a focused laser beam 13. The magnetic material can be formed anisotropically or isotropically (without a preferred magnetic direction). Deviating from the magnetization direction indicated in the drawing, the magnetization can also be chosen in the x direction. Also in the case of an isotropic material, it may be desired that the magnetization direction be in either the z and x direction, or have components in these directions. The permanent magnet 5 can execute movements in the described suspension in the focusing direction z, in the radial direction x and in combined directions. The z direction runs perpendicular to the storage medium (not shown), on the tracks of which the light beam 13 is focused, and the radial direction x is the direction in which a radial compensation of the photo optical unit 11 can be accomplished so that the light beam can precisely traverse the desired track of the storage medium, and not leave it. The y direction, in which the spring rods run, is the direction which runs perpendicular to the x and z direction.

Two pairs of coils 17 and 19 are provided to move the permanent magnet 5 in the z and x direction. These pairs of coils 17 and 19 lie in planes 20, 21, which run in the x-y direction and have a clearance 22, which approximately corresponds to the height h of the permanent magnet 5. It is possible to achieve a simple construction of the pairs of coils 17 and 19 in that the coils are provided with one or several turns on the upper side 23 or underside 24 of printed-circuit boards. These printed-circuit boards 25 can be connected to the support 1 in the region 26.

Each coil 17a, 17b, 19a, 19b of the pairs of coils 17, 19 has a conductor length 17c, 17d or 19c, 19d. These conductor lengths run in the y direction and at a clearance from the permanent magnet 5. Conductor lengths 17c, 17d and 19c, 19d have a length L, which approximately corresponds to the length of the permanent magnet 5 in the y direction. The permanent magnet 5 is located in its middle position when the pairs of coils 17, 19 are not conducting an electric current. This middle position lies approximately within the parallel planes 20, 21, and approximately in the middle between the conductor rods 17c, 17d or 19c, 19d.

With this actuator, magnet movements, and thus movements of the optical unit 11, can be brought about in the two directions x and z. Each individual coil 17a, 17b, 19a, 19b exerts on the magnet 7 a force and a torque, both in general having several components. The intended movement in the z and x direction (2D movement) of the magnet in the focusing and radial direction presupposes the two independent forces in these directions. Force components in other directions and torques are, if possible, not to arise, since the mechanical suspension provided by the spring rods may be displaced in other directions. For example, it is undesirable to have the magnet 5 twist instead of moving along the linear directions. To generate the focusing force and the radial force, the coils must purposely be individually driven, in order to obtain a specific field acting on the magnet 5. Given coil currents independent of one another, the resultant force vector can then contain either only a z component or only a x component, the resultant torques vanishing. Likewise, however, arbitrary superimpositions of the two forces can be obtained, whereby the magnet is moved simultaneously in the z and x direction.

Figure 2:
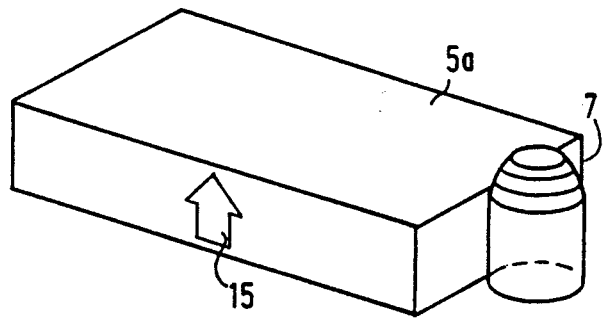
FIG. 2 shows another embodiment of the magnet in the actuator according to FIG. 1.

FIG. 2 shows a modified permanet magnet arrangement 5a, in which the optical unit 11 is arranged alongside the permanent magnet. As in FIG. 1, the permanent magnet 5a is magnetized in the z direction (arrow 15) and may comprise an anisotropic or isotropic material. Deviating from the representation according to FIG. 2, the magnetization can also run in the x direction or, in the case of isotropic material, can run in the z and x direction or have components in these directions.

Figure 3:
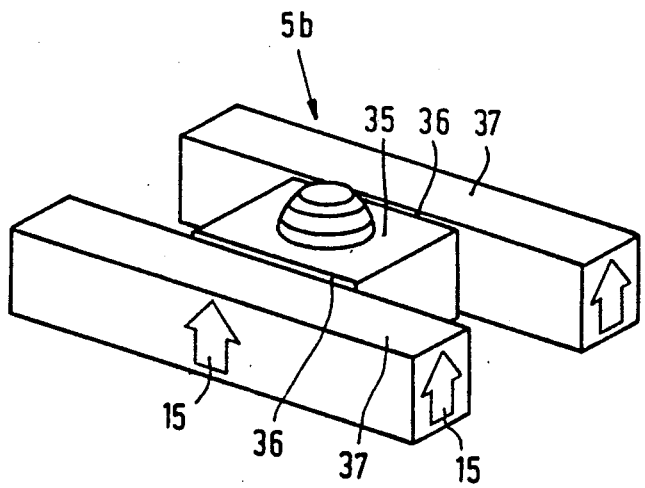
FIG. 3 shows another further embodiment of the magnet in the actuator according to FIG. 1.

FIG. 3 shows a further modified permanent magnet arrangement 5b. In this connection, the permanent magnet arrangement consists of a central support 35, for example of plastic, which supports the optical unit, which is oriented in the z direction. On its sides 36 facing the conductor rods, the support 35 is provided with rod-shaped permanent magnets 37. The rod-shaped permanent magnets 37 extend parallel to the conductor lengths 17c, 17d, 19c, 19d. As in FIG. 1, the permanent magnets 37 are magnetized in the z direction (arrow 15) and may comprise anisotropic or isotropic material. Deviating from the position in FIG. 3, the magnetizations can also run in the x direction or, in the case of isotropic material, run in the z and x direction, or have components in these directions.

We claim:

1. An electrodynamic actuator for an optical write-in and/or read-out unit, for aligning the unit with respect to signal tracks of a storage medium to direct a focussed beam of light onto a work position, comprising:

a support resilient means for mounting said unit to said support, arranged to allow movement of said unit with respect to said support in a focusing direction and a radial direction, a permanent magnet arrangement fixed to said unit for movement therewith, and a plurality of stationary coils fixed with respect to said support for moving the unit at least in selected directions, characterized in that said coils have respective coil axes parallel to the focusing direction, and are spaced from each other in the radial direction a distance greater than a largest dimension of said magnet arrangement in the radial direction, said resilient means comprise spring rods having respective free ends to which the permanent magnet arrangement with the optical unit is secured, and respective opposing ends fixed to said support, said rods positioning the unit and the permanent magnet arrangement such that the permanent magnet arrangement is disposed between said coils and is movable in the focusing and radial directions, and said permanent magnet arrangement provides a magnetic field in a region near parts of the coils to produce, in response to currents in the coils, movements of the permanent magnet arrangement in the focusing direction and/or radial direction.

2. An actuator as claimed in claim 1, characterized in that said plurality of coils comprises four coils, arranged as a respective coaxial pair one to each side of the permanent magnet arrangement, each coil comprising a conductor portion extending adjacent the permanent magnet arrangement in a direction perpendicular to the focusing and the radial directions.

3. An actuator as claimed in claim 2, characterized in that each coil lies in one of two parallel planes.

4. An actuator as claimed in claim 2, characterized in that each of said conductor portions and the permanent magnet arrangement have approximately the same lengths in said direction perpendicular to the focusing and radial directions.

5. An actuator as claimed in claim 4, characterized in that said conductor portions of each pair of coils are spaced from each other a distance approximately equal to a length of the permanent magnet arrangement in the focusing direction, and in a middle position with no current through said coils the permanent magnet arrangement is located approximately between said parallel planes and is equally spaced from said portions.

6. An actuator as claimed in claim 5, characterized in that said permanent magnet arrangement comprises a permanent magnet having a central aperture extending in the focusing direction, said optical unit being disposed in said aperture with the optical axis oriented in the focusing direction.

7. An actuator as claimed in claim 5, characterized in that said permanent magnet arrangement comprises a permanent magnet, and means laterally supporting said optical unit on said magnet with an optical axis of said unit oriented in the focusing direction.

8. An actuator as claimed in claim 5, characterized in that the permanent magnet arrangement includes a central support for supporting the optical unit with an optical axis oriented in the focusing direction, and two permanent magnets disposed laterally with respect to the optical unit and the conductor portions.

9. An actuator as claimed in claim 5, characterized in that the permanent magnet arrangement has a preferred magnetic direction aligned in the focusing direction, and is an anisotropic material magnetized in the focusing direction.

10. An actuator as claimed in claim 5, characterized in that the permanent magnet arrangement has a preferred magnetic direction aligned in a direction perpendicular to the focusing and radial directions, and is an anisotropic material magnetized in said preferred magnetic direction.

11. An actuator as claimed in claim 1, characterized in that said permanent magnet arrangement comprises a permanent magnet having a central aperture extending in the focusing direction, said optical unit being disposed in said aperture with the optical axis oriented in the focusing direction.

12. An actuator as claimed in claim 1, characterized in that said permanent magnet arrangement comprises a permanent magnet, and means laterally supporting said optical unit on said magnet with an optical axis of said unit oriented in the focusing direction.

13. An actuator as claimed in claim 1, characterized in that the permanent magnet arrangement includes a central support for supporting the optical unit with an optical axis oriented in the focusing direction, and two permanent magnets disposed laterally with respect to the optical unit and the conductor portions.

14. An actuator as claimed in claim 1, characterized in that the permanent magnet arrangement has a preferred magnetic direction aligned in the focusing direction, and is an anisotropic material magnetized in the focusing direction.

15. An actuator as claimed in claim 1, characterized in that the permanent magnet arrangement has a preferred magnetic direction aligned in a direction perpendicular to the focusing and radial directions, and is an anisotropic material magnetized in said preferred magnetic direction.

16. An actuator as claimed in claim 1, characterized in that said permanent magnet arrangement comprises a magnet made of isotropic material magnetized in said focusing direction.

17. An actuator as claimed in claim 1, characterized in that said permanent magnet arrangement comprises a magnet made of isotropic material magnetized in a direction perpendicular to said focusing and radial directions.

18. An actuator as claimed in claim 1, characterized in that said permanent magnet arrangement comprises a magnet made of isotropic material magnetized in a direction having components in the focusing direction and perpendicular to said focusing and radial directions.

19. An actuator as claimed in claim 1, characterized in that said plurality of coils comprises four coils, arranged as a respective coaxial pair one to each side of the permanent magnet arrangement, each of the pairs of coils is formed by strips providing conducting runs on opposite surfaces of a printed circuit board, and each coil comprises a conductor portion extending adjacent the permanent magnet arrangement in a direction perpendicular to the focusing and the radial directions.

20. An electrodynamic actuator for an optical write-in and/or read-out unit, for aligning the unit with respect to signal tracks of a storage medium to direct a focussed beam of light onto a work position, comprising:

a support resilient means for mounting said unit to said support, arranged to allow movement of said unit with respect to said support in a focusing direction and a radial direction, a permanent magnet arrangement fixed to said unit for movement therewith, and a plurality of stationary coils fixed with respect to said support for moving the unit at least in selected directions, characterized in that said coils have respective coil axes parallel to the focusing direction, and are spaced from each other in the radial direction a distance greater than a largest dimension of said magnet arrangement in the radial direction, said resilient means comprises a plurality of substantially inextensible spring rods having respective free ends to which the permanent magnet arrangement with the optical unit is secured, and respective opposing ends fixed to said support, said rods positioning the unit and the permanent magnet arrangement such that the permanent magnet arrangement is disposed between said coils at a fixed distance from said support, and is movable in the focusing and radial directions, and said permanent magnet arrangement provides a magnetic field in a region near parts of the coils to produce, in response to currents in the coils, movements of the permanent magnet arrangement in the focusing direction and/or radial direction.

21. An actuator as claimed in claim 20, characterized in that said plurality of coils comprises four coils, arranged as a respective coaxial pair one to each side of the permanent magnet arrangement, each coil comprising a conductor portion extending adjacent the permanent magnet arrangement in a direction perpendicular to the focusing and the radial directions.

* * * * *